United States Patent [19]

Yeomans

[11] Patent Number: 4,800,379
[45] Date of Patent: Jan. 24, 1989

[54] IMAGE DISPLAY WITH MOVABLE MAGNIFICATION

[75] Inventor: Andrew J. V. Yeomans, Hertfordshire, England

[73] Assignee: Crosfield Electronics Limited, London, England

[21] Appl. No.: 44,264

[22] Filed: Apr. 30, 1987

[30] Foreign Application Priority Data

May 12, 1986 [GB] United Kingdom ............ 8611554

[51] Int. Cl.⁴ .................................................. G09G 1/16
[52] U.S. Cl. .................................... 340/731; 340/750; 340/798
[58] Field of Search ............... 340/731, 721, 728, 729, 340/720, 723, 750, 748, 798, 799

[56] References Cited

U.S. PATENT DOCUMENTS

| | | | |
|---|---|---|---|
| Re. 31,200 | 4/1983 | Sukonick et al. | 340/721 |
| 3,011,164 | 11/1961 | Gerhardt | 340/731 |
| 3,499,760 | 2/1970 | Kiesling | 340/731 |
| 4,257,044 | 3/1981 | Fukuoka | 340/731 |
| 4,366,475 | 12/1982 | Kishi | 340/731 |
| 4,532,605 | 7/1985 | Waller | 340/731 |

Primary Examiner—Marshall M. Curtis
Attorney, Agent, or Firm—Sughrue, Mion, Zinn, Macpeak and Seas

[57] ABSTRACT

Apparatus for displaying an image defined by digital data representing the color content of the pixels of the image comprises a monitor; a first store for storing digital data representing an image at low resolution and a second store for storing digital data representing a magnified portion of the image at high resolution. A microcomputer is connected to the stores and to the monitor and an indicator assembly is acutable by an operator to select an area of an image displayed by the monitor. The microcomputer is responsive to a "magnify" signal from the indicator assembly to cause the monitor to display a portion of the selected after magnification, the portion being displayed within the selected area. The microcomputer suppresses pixels of the orginally displayed image within the remaining portion of the selected area, the degree of magnification being such that the magnified portion substantially fills the selected area.

7 Claims, 1 Drawing Sheet

IMAGE DISPLAY WITH MOVABLE MAGNIFICATION

FIELD OF THE INVENTION

The invention relates to methods and apparatus for displaying images on a monitor.

DESCRIPTION OF THE PRIOR ART

In conventional image reproduction systems it is common for an original image to be scanned and the colour content of individual pixels of the image to be digitally coded and stored. The stored data is then used to control a monitor to enable the scanned image to be viewed and modified by for example applying colour correction techniques and the like. One type of modification is to extract part of an image for inclusion in another image. To achieve this the operator "draws" an outline around the image portion concerned by making use of a cursor and a digitising table linked to a controlling microcomputer. This can, on occasion, be difficult to achieve since a typical monitor is only able to display a total of 1024×1024 pixels at any instant. Thus, in order to display a reasonable portion of the image it is necessary to display the image at a relatively low resolution compared with the much higher resolution with which the image was scanned. An example of a conventional system is our Studio 800 series.

Another example of such a system which also suffers from these problems is described in DE2516191.

SUMMARY OF THE INVENTION

In accordance with one aspect of the present invention, a method of displaying an image on a monitor, the image being defined by digital data representing the colour content of pixels of the image comprises (1) causing the monitor to display the image under the control of the digital data;

(2) selecting an area of the displayed image;

(3) determining subsidiary digital data defining a portion of the selected area of the image after magnification; and (4) causing the monitor to display the magnified portion within the selected area, pixels of the originally displayed image within the remaining portion of the selected area being suppressed, whereby the degree of magnification is such that the magnified portion substantially fills the selected area.

In the past, magnification of a displayed image has been achieved by displaying a magnified portion to one side of the originally displayed image which is still displayed in its entirety at the same low resolution or in place of the originally displayed image. This is not helpful when an operator is attempting to draw an accurate outline. The invention deals with this problem by causing a portion of the originally displayed image within a selected area to be magnified and displayed centered on the position the portion had relative to the original image prior to magnification. The magnified portion can thus be seen in its proper context within the remainder of the image with only a relatively small portion of the remaining image being suppressed to make room for the magnified portion.

Magnification can take one of two forms. The simplest form is to replicate pixels in the original low resolution image. This is conventionally termed "zoom" and provides a fair indication of detail which may not otherwise have been clearly visible to the operator. An alternative form of magnification is achieved by displaying a high resolution representation of the portion within the selected area. This enables fine detail in the magnified portion to be seen.

In a typical operation, the operator will move a cursor over a digitising table and the outline of the border of a selected area centered on the cursor position will be displayed on the monitor. For example, the selected area may be circular or square. When the operator wishes to the magnify a portion of the image he will position the cursor appropriately and then select a "magnification" option by generating a suitable control signal to the microcomputer. The magnified portion will then be displayed within the selected area.

In general, after the magnified portion has been reviewed by the operator, the system will revert to normal with just the coarse representation of the image being displayed.

In an alternative form, the subsidiary digital data is determined to be high resolution data if the cursor is stationary and to define replicated coarse (zoomed) data if the cursor is moving. This gives the appearance to the operator of a continuously magnified portion within the selected area as he causes the selected area to move but in fact the type of magnification changes depending on whether the selected area is moving or stationary. The reason for this is that at typical high resolutions in the order of 90000 pixels per square inch, there is insufficient high-speed memory to hold the high resolution image in its entirety. The high resolution image is, therefore, usually held in a disc store, and so it takes a significant time to load the high resolution data into the appropriate high-speed memory for display. Replication of data is, however, much quicker, as the data is already in the high-speed memory.

In a further modification, the degree of magnification within the selected area may vary, typically from a high level near the centre of the area to a relatively low level at the boundary of the area, thus giving a "fish-eye" lens effect.

It should be understood that the image referred to above could form part of a larger image and does not necessarily correspond to the entire scanned image.

In accordance with a second aspect of the present invention, apparatus for displaying an image defined by digital data representing the colour content of pixels of the image comprises a monitor; a memory for storing digital data corresponding to an image displayed on the monitor; control means connected to the memory and the monitor; and an indicator assembly which is actuable by an operator to select an area of an image displayed by the monitor, the control means being responsive to a "magnify" signal from the indicator assembly to cause the monitor to display a portion of the selected area after magnification, the portion being displayed within the selected area and to suppress pixels of the originally displayed image within the remaining portion of the selected area, whereby the degree of magnification is such that the magnified portion substantially fills the selected area.

The memory could store digital data representing the image at high resolution, or at low resolution in which case the control means will include scaling means to adapt the resolution of the stored data before it is used to control the monitor. For example, if the data represents the image at low resolution, the scaling means is used to replicate data representing pixels within the magnified portion. Alternatively, if the stored digital data represents the image at high resolution, the scaling means will reduce the resolution for the normal display, the stored data being read directly for the magnified portion.

In a preferred arrangement, the memory comprises a first store for storing digital data representing the image at low resolution, and a second store for storing digital data representing the magnified portion of the image at high resolution, the control means being responsive to mask data to cause the monitor to display the portion of the image, defined by data in the first store, outside the selected area and the magnified image portion, defined by data in the second store, within the selected area of the monitor.

Conveniently, the apparatus further comprises a mask store which stores data defining a mask corresponding to the selected area.

Although the invention is primarily concerned with the display of coloured images, the invention is also applicable to monochrome.

The terms "high" and "low" resolution are intended only to indicate relative resolutions.

BRIEF DESCRIPTION OF THE DRAWINGS

Some examples of methods and apparatus in accordance with the invention will now be described with reference to the accompanying drawings, in which.

DETAILED DESCRIPTION OF EMBODIMENTS

Figure 1:
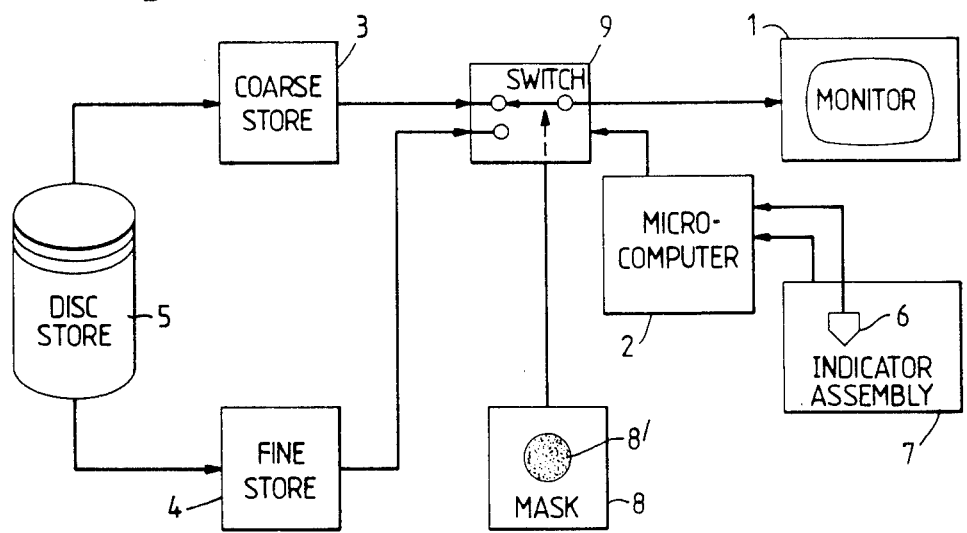
FIGS. 1 and 2 are schematic block diagrams of two examples.

The apparatus shown in FIG. 1 comprises a monitor 1 connected to a switch 9. Two digital stores 3, 4 are provided each of which is connected in use to a disc store 5. The disc store 5 contains digital data representing the colour content of pixels of an image and this data will typically have been generated by scanning an original image using conventional scanning apparatus such as the Crosfield Magnascan 645. The digital data on the disc 5 will typically be stored in two forms. Firstly, at a high or fine resolution corresponding to the resolution at which the original image was scanned and also at a lower or coarse resolution for the purposes of normal display on the monitor. Control of the monitor display is achieved by a cursor 6 and a digitising table 7 connected to a microcomputer 2 which is connected to the monitor via the switch 9.

In operation, the cursor 6 is used in conjunction with the digitising table 7 to cause the microcomputer 2 to display a portion of the image stored on the disc 5. Once the image portion has been selected, the microcomputer 2 causes the relevant data representing that portion at coarse resolution to be downloaded into the store 3 and then controls the monitor in response to that data in the store 3.

The operator can cause the outline of a small, preferably circular, area to be moved around the image displayed on the monitor. If he desires a portion of the image within the area to be magnified he issues a "magnify" instruction to the microcomputer 2 and the appropriate portion of the image as represented by the high resolution data in the disc store 5 is downloaded into the fine store 4.

The shape and position of the selected area 8' is preloaded into a mask store 8 and is used by the microcomputer 2 to control the position of a switch 9.

The video signal used to control the monitor 1 is selected by suitable actuation of the switch 9 so as to correspond to data from the coarse store 3 where the data in the mask store 8 is a binary "zero" (outside the area 8') or from the fine store 4 where the mask contains a binary "one" (inside the area 8'). The position of the mask within the store 8 will vary as the outline of the selected area moves around the monitor.

The result of this is that a portion of the image within the selected area (smaller than the selected area when at coarse resolution) will be displayed at high resolution enabling the operator to view that portion in much greater detail. Since the magnified portion will physically cover an area of the monitor screen greater than the corresponding coarse representation, it is necessary to suppress a portion of the low resolution image but in practice this will not be significant.

If in addition the relative positions of the mask and image planes can be shifted, the mask plane can be moved relatively to the low resolution image and simultaneously moved relatively to the high resolution image at different rates. The rates are arranged so that the centre of the mask always lies over the corresponding pixel in the two image planes. With this arrangement there is no need to modify the contents of the two image stores or the mask store, providing that all the selected area is held within the image stores. This means that the selected area can be moved over the display extremely rapidly. When the selected area is moved so that the portion of the high resolution image is not held within the fine store, it is necessary to load that portion from the disc store, which may take a significant time.

A separate cross-hair cursor could be displayed on the monitor 1 centered over the centre of the selected area to show the central position accurately.

Figure 2:
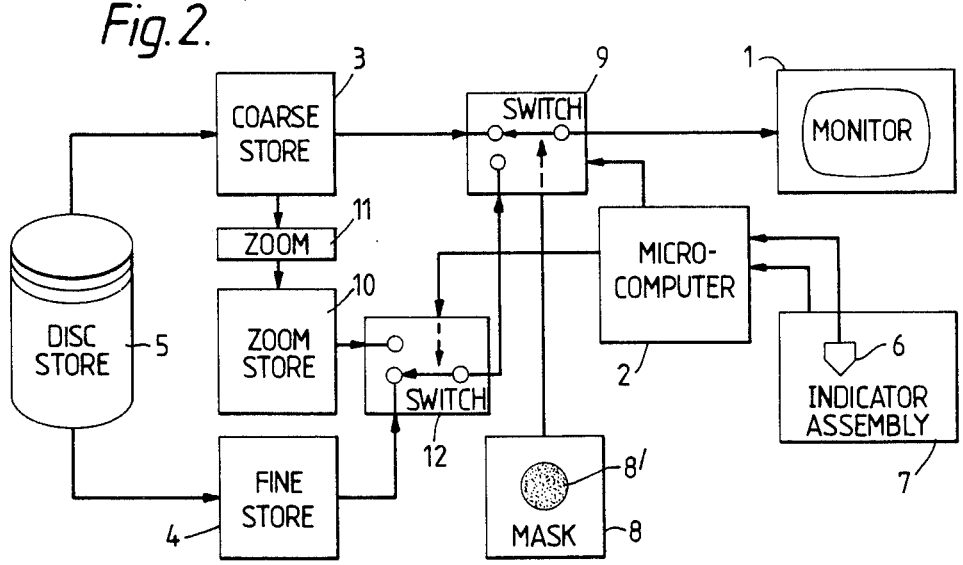

FIG. 2 illustrates a system for showing a magnified portion of the image either as zoomed pixels or as a high resolution representation as in FIG. 1. This is achieved by adding to the FIG. 1 example a third plane of image memory 10 and conventional "zoom" hardware 11. In this case, a portion the coarse representation of the image, as displayed on the monitor 1, is also copied by the zoom hardware 11 to the zoom store 10, the hardware 11 selecting the addresses of the pixels to be copied so that the resultant image portion is enlarged by replicating the pixel data a number of times, the number depending on the degree of magnification. The switch 12 is controlled by the microcomputer 2 so as to select either the information from the zoom store 10 or from the fine store 4 to be displayed in the selected area defined by the store 8.

In operation, the switch 12 will select the image from the zoom store 10 if a high resolution image portion has not been loaded into the digital store 4. When movement of the cursor 6 ends, the appropriate portion of the high resolution image will be loaded into the store 4 and the switch 12 will be changed so that the digital store 4 is accessed. In practice, this will enable sucessive portions of the originally displayed image to be enlarged as the cursor is moved since during movement the zoom store 10 will be accessed while once movement has ceased, and after a short interval in which the relevant high resolution portion is loaded into the digital store 4, the store 4 will be accessed. A variation of this method (not shown) avoids the use of the zoom store 10 and the switch 12, by copying the coarse image by the zoom hardware 11 directly to the fine store 4. The zoomed image will be loaded into the portion of the fine store which does not hold the correct part of the high resolution image. When the high resolution image is later read into the fine store, it will over-write this zoomed area. A second variation of this method uses the mask information to modify the pixel addresses being read from the image memory to provide the zoom effect. This means that the zoom store 10 and separate zoom hardware 11 are not required.

This scheme could be used when showing a simple zoomed image, by using the cursor to modify the pixel addresses being read from the image memory to provide the zoom effect.

In another form of the invention, (not shown) the mask need not exist as a "bit plane" in its own store 8. Instead, the shape of the mask could be generated at video rates. This is particularly straightforward for rectangular shapes, as the switching is then performed whenever the address being read is within the given range of addresses centered on the centre of the cursor.

I claim:

1. A method of displaying an image on a monitor, said image being defined by digital data representing the colour content of pixels of said image, said method comprising:
   (1) causing said monitor to display said image under the control of said digital data;
   (2) moving an image area selecting outline through ones of a plurality of positions on said displayed image, the size of said outline being smaller than said displayed image;
   (3) determining, for each position of said outline, subsidiary digital data defining a portion of said image within said outline after magnification and corresponding to said position; and
   (4) causing said monitor to display said magnified portion within said outline, pixels of the originally displayed image within the remaining portion of said outline being suppressed, such that said magnified portion substantially fills said outline, while the remainder of said image outside said outline is displayed unchanged.

2. A method according to claim 1, wherein said subsidiary digital data is determined to define high resolution data if said outline is stationary and to define replicated coarse data if said outline is moving.

3. Apparatus for displaying an image defined by digital data representing the colour content of pixels of said image, said apparatus comprising a monitor; a memory for storing digital data corresponding to an image displayed on said monitor; control means connected to said memory and said monitor; and an indicator assembly actuable by an operator to move an image area selecting outline across an image displayed by said monitor, the size of said outline being smaller than said displayed image, said control means causing, at each position of said outline, said monitor to display a portion of said image within said outline after magnification and corresponding to said position, said portion being displayed within said outline, and to suppress pixels of the originally displayed image within the remaining portion of said outline, such that said magnified portion substantially fills said outline while the remainder of said image outside said outline is displayed unchanged.

4. Apparatus according to claim 3, wherein said control means includes scaling means to adapt the resolution of said stored data before it is used to control said monitor.

5. Apparatus according to claim 3, wherein said memory comprises a first store for storing digital data representing said image at low resolution, and a second store for storing digital data representing said magnified portion of said image at high resolution, said control means being responsive to mask data to cause said monitor to display the portion of said image, defined by data in said first store, outside said outline and said magnified image portion, defined by data in said second store, within said outline.

6. Apparatus according to claim 5, wherein said memory further comprises a third store for storing digital data representing said magnified portion of said image as replicated low resolution pixels, said control means causing one of said second and third stores to be accessed according to whether said outline is stationary or moving respectively.

7. Apparatus according to claim 3, further comprising a mask store which stores data defining a mask corresponding to said outline.

* * * * *